June 6, 1961 W. A. HARRIS 2,987,026

METHOD AND APPARATUS FOR RAISING SUNKEN SHIPS

Filed Aug. 1, 1957

8 Sheets-Sheet 1

INVENTOR.
William A. Harris

BY

L. S. Saulsbury

ATTORNEY

June 6, 1961 W. A. HARRIS 2,987,026

METHOD AND APPARATUS FOR RAISING SUNKEN SHIPS

Filed Aug. 1, 1957 8 Sheets-Sheet 2

INVENTOR.
William A. Harris

BY L. S. Saulsbury

ATTORNEY

METHOD AND APPARATUS FOR RAISING SUNKEN SHIPS

Filed Aug. 1, 1957 8 Sheets-Sheet 3

INVENTOR.
William A. Harris
BY L. S. Saulsbury
ATTORNEY

METHOD AND APPARATUS FOR RAISING SUNKEN SHIPS

Filed Aug. 1, 1957

8 Sheets-Sheet 4

INVENTOR.
William A. Harris

BY L. S. Saulsbury

ATTORNEY

INVENTOR.
William A. Harris
BY
L. S. Saulsbury
ATTORNEY

METHOD AND APPARATUS FOR RAISING SUNKEN SHIPS

Filed Aug. 1, 1957

INVENTOR.
William A. Harris
BY
L. S. Saulsbury
ATTORNEY

INVENTOR.
William A. Harris
BY L. S. Saulsbury
ATTORNEY

INVENTOR.
William A. Harris
BY
L. S. Saulsbury
ATTORNEY

United States Patent Office 2,987,026

Patented June 6, 1961

2,987,026

METHOD AND APPARATUS FOR RAISING SUNKEN SHIPS

William A. Harris, 306 Rose Ave., Staten Island 6, N.Y.

Filed Aug. 1, 1957, Ser. No. 675,591
7 Claims. (Cl. 114—53)

This invention relates to a method and apparatus for raising large sunken ships of the ocean liner type from the bottom of the sea.

It is the principal object of the present invention to provide a simple method and apparatus that may be used effectively and efficiently to raise large sunken ships and ocean liners from the sea floor.

It is another object of the invention to provide a method and apparatus for raising sunken ships that rest on their side upon the sea floor.

It is still another object of the invention to provide in a method and apparatus for raising sunken ships in which the equipment can be readily and easily handled and connected to the ship by divers working on the sea floor and so that the man hauling power for the cables will be reduced to a minimum.

It is still another object of the invention to provide port hole clamp devices that are easily insertable in the port holes of the ship by which the lifting cable lines can be connected to the sides of the ship and which are so constructed that cables may be extended from the clamp devices in a direction either normal to the side of the ship or parallel thereto.

It is still another object of the invention to provide cable clamps adapted for the attachment of cables to the bilge keels on the bottom of the ship that extend thereunder in a cradle fashion so that the pressure upon the keels will be stabilized.

It is a further object of the invention to provide lifting pontoons with stress adjusting units by which the lifting pressure in the various cables extending therefrom will be evened so that the pontoons can be placed and maintained in a horizontal position and by which the slack in cable can be taken up.

It is a still further object of the invention to provide self-submerging pontoons which can be controlled by an operator within one of a group of pontoons either from a compartment in the interior of the pontoon or from the top exterior thereof.

It is a still further object of the invention to provide a simple mending or bracing bar or strongback which is adapted to be extended between the port holes on the opposite sides of a puncture or opening in the side of the ship in order to strengthen the ship, at the opening prior to its being lifted and to prevent further fracture.

Other objects of the invention are to provide a method and apparatus for raising sunken ships or vessels, that have the above objects in mind, in which the equipment is of simple construction, easily and safely handled by service ships and skin divers, fully quickly attachable, the equipment is usable for different type ships, may be used with standard salvaging and wrecking equipment, in which the equipment can be applied to the ship so as not to do harm to the top decks of the ship and which will raise the ship with minimum breakage or injury.

Figures 1, 2, 3:
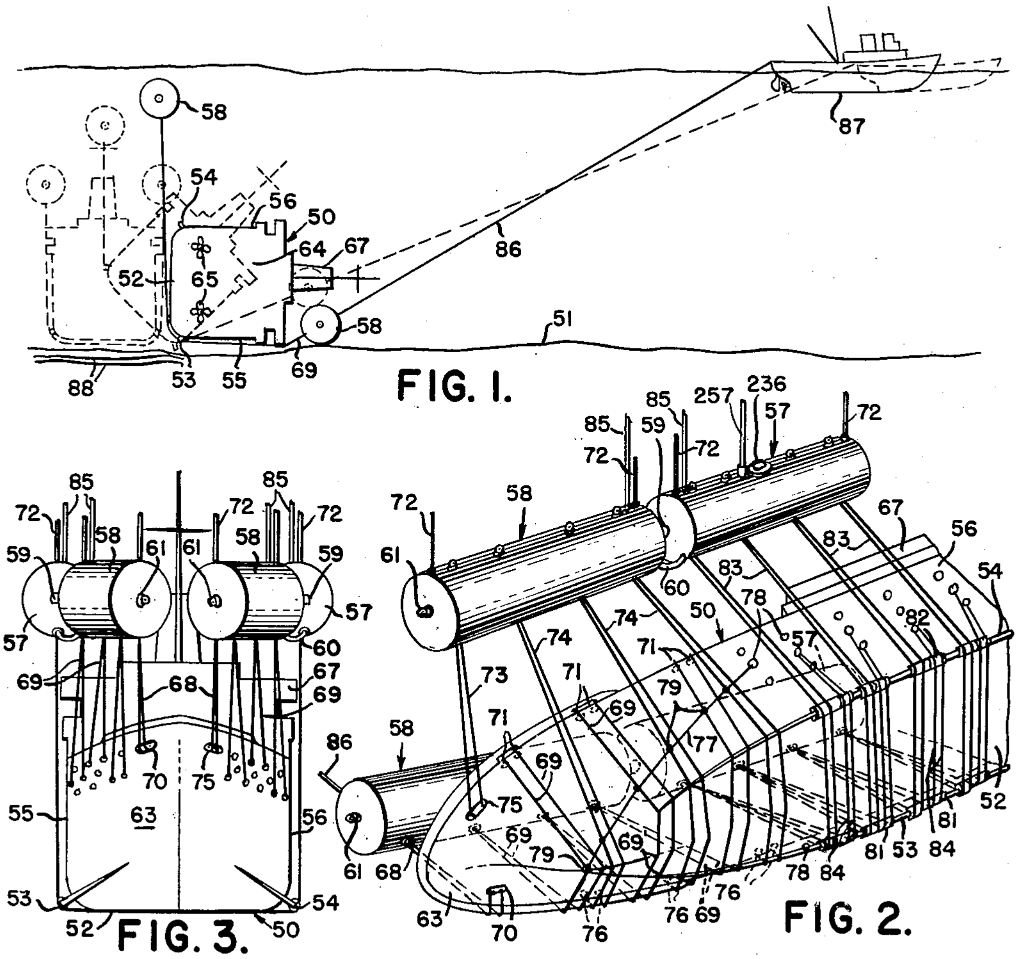
Figure 4:
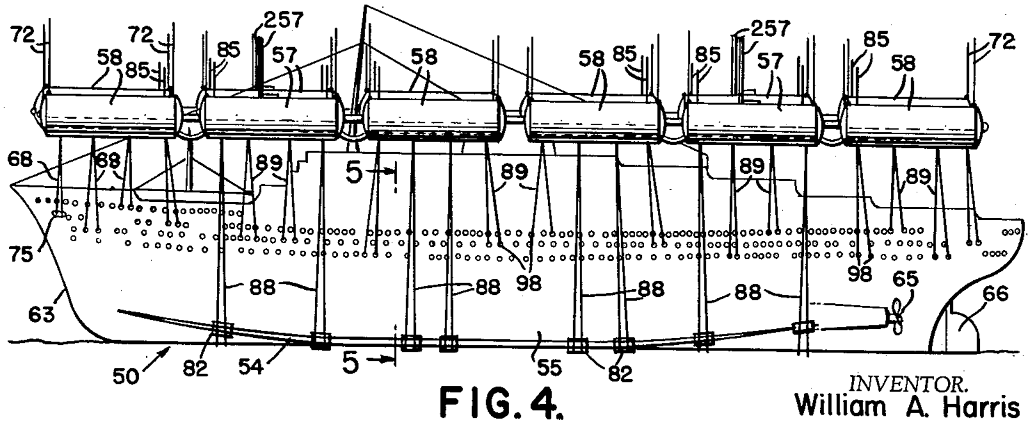
Figures 5, 26, 27, 28:
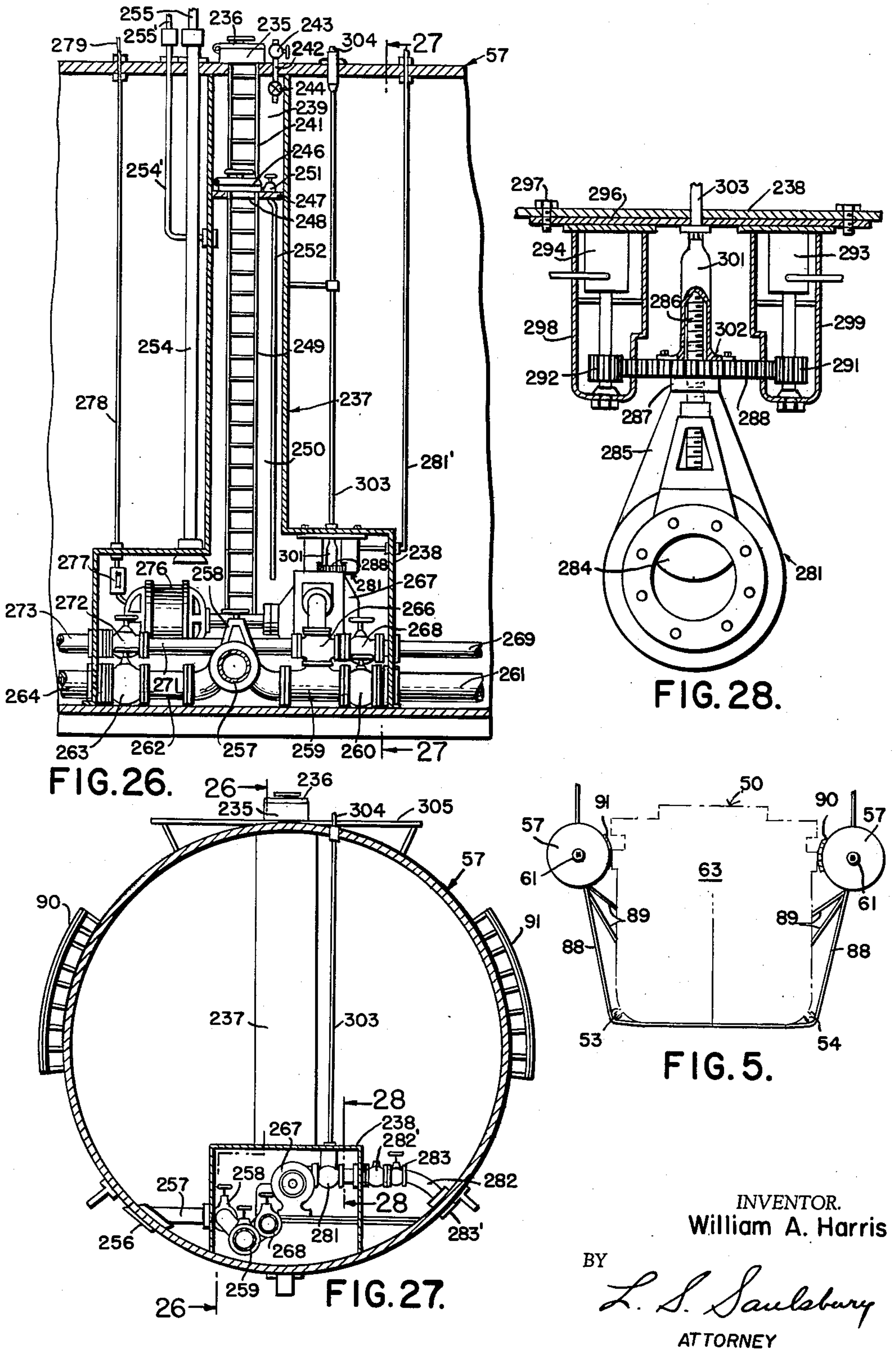
Figures 6, 7, 16, 17, 18:
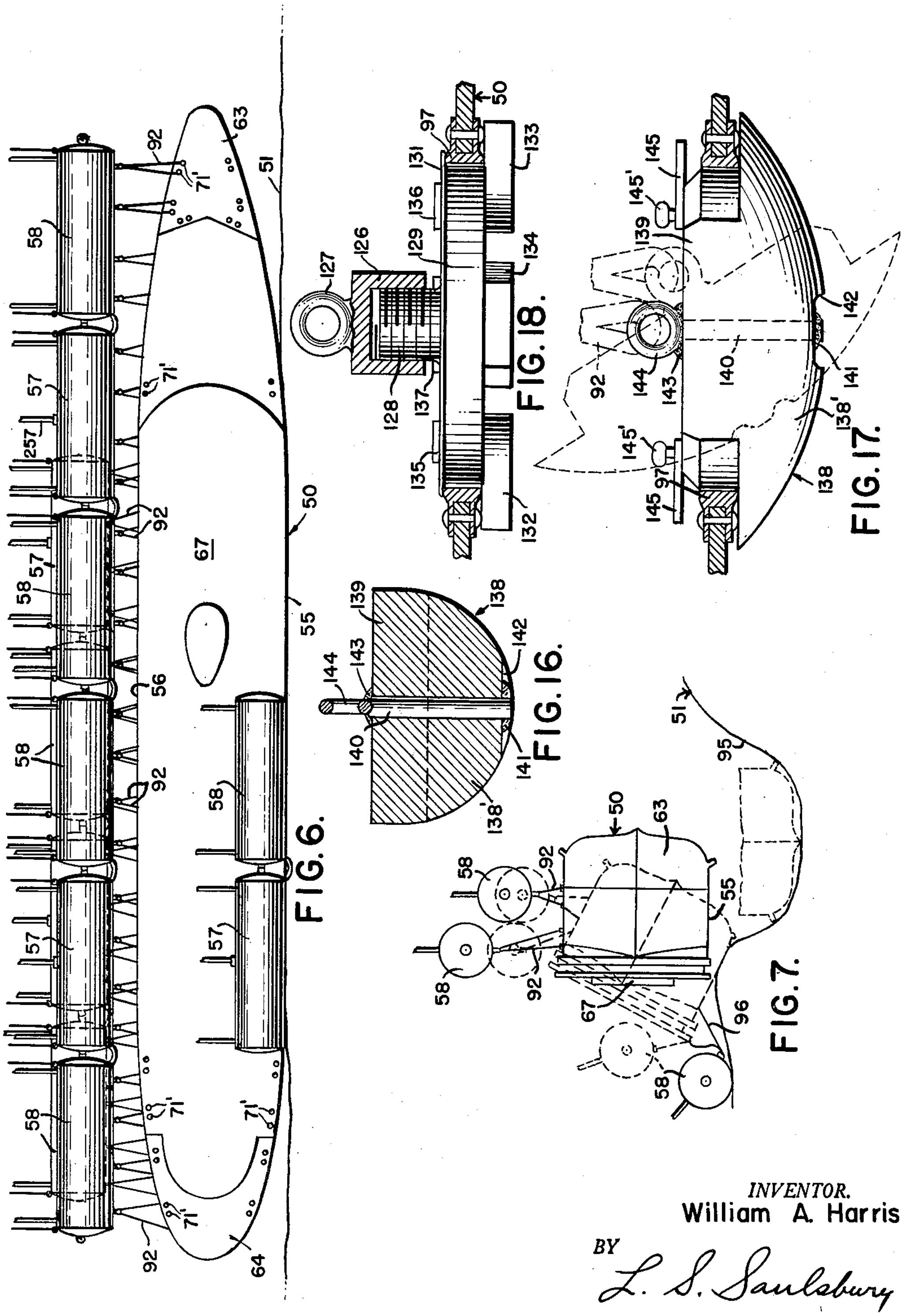
Figures 8, 9:
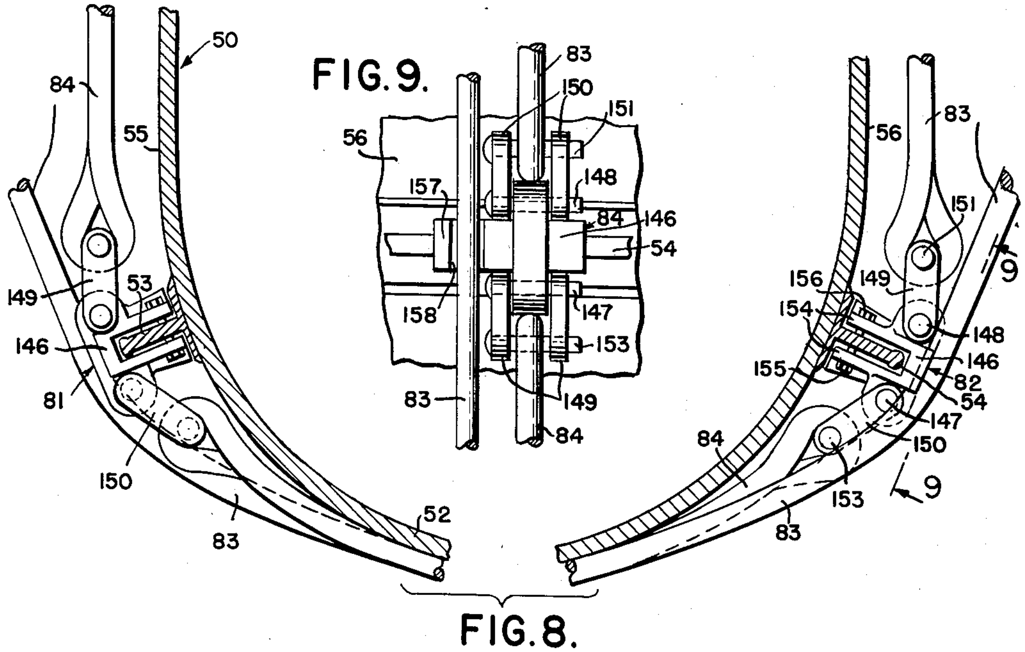
Figures 10, 11:
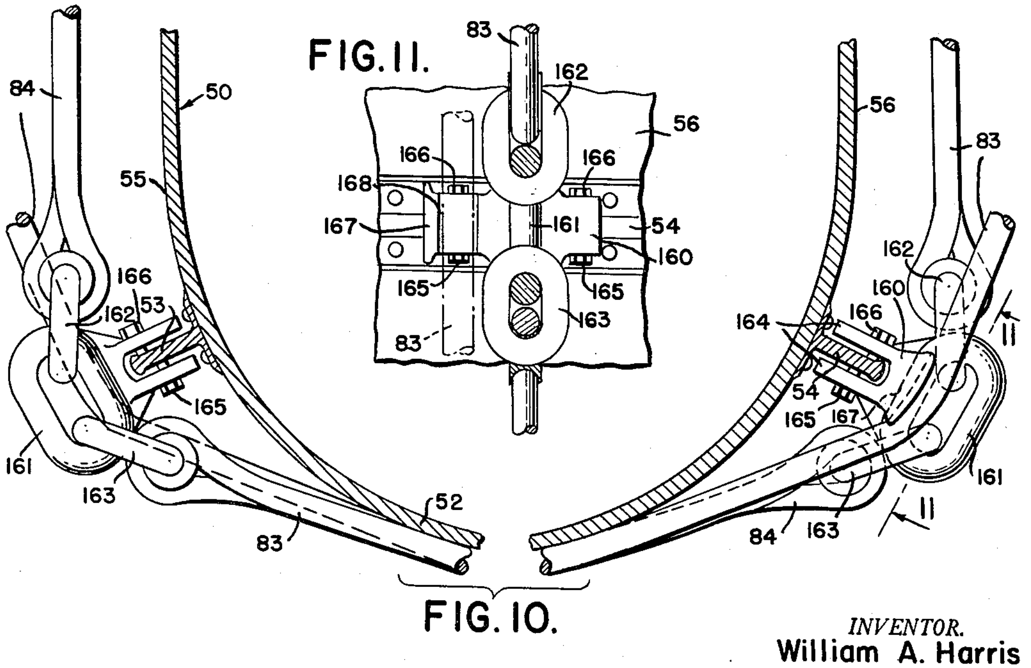

For other objects, and for a better understanding of the invention, reference may be had to the following detailed description taken in connection with the accompanying drawing, in which FIGURE 1 is an illustrative elevational view of a ship or ocean liner resting upon the sea floor on its starboard side, the illustration being made as to the manner in which the ship is uprighted by pontoons while a service ship is pulling on the pontoons to keep them clear of the upper decks and at the same time assisting the pontoons in turning the ship to its upright position, FIG. 2 is a perspective view looking upon the bow of the ship as it rests on its side on the sea floor and with pontoons connected by their turning cables around the bottom and sides of the ship preparatory to the pontoons being pumped out and the pull by the service ships being applied, FIG. 3 is an end elevational view of the ship and of the pontoons just after the ship has been uprighted on the sea floor, FIG. 4 is a side elevational view of the ship looking upon its port side with the complete system of the pontoons, twelve in all, above the sides of the ship preparatory to effecting the final lifting operation upon the ship, FIG. 5 is an elevational view taken generally on line 5—5 of FIG. 4 through the ship and when the pontoons have been lowered upon the ship for engagement with the sides there to effect the lifting of the ship from shallow waters, FIG. 6 is an elevational view of the ship as it rests on the sea floor and looking upon the top deck structure with pontoons attached to the port holes in the port side of the ship and adapted to be pumped out to effect dead lifting of the ship from off the sea floor, and preparatory to the carrying out of another method of uprighting the ship, FIG. 7 is an illustrated end view of the ship suspended from the pontoons and lying over a depression or trench in the sea floor and with illustration being made to the manner in which the ship is uprighted thereinto, FIG. 8 is an enlarged fragmentary sectional view taken through the bottom of the ship along the bilge keels, generally on line 5—5 of FIG. 4 and looking upon the cables arranged in a cable-like manner under the bottom of the ship and the bilge keel clamps therefor, FIG. 9 is a fragmentary elevational view looking in plan upon the bilge keel cable clamps as viewed on line 9—9 of FIG. 8, FIG. 10 is an enlarged fragmentary sectional view taken through the ship, similar to FIG. 8, but showing a modified form of a bilge keel cable clamp, FIG. 11 is a fragmentary sectional view of the cable clamp used in the modified form of assembly shown in FIG. 10, the view being taken on line 11—11 of FIG. 10.

Figure 13:
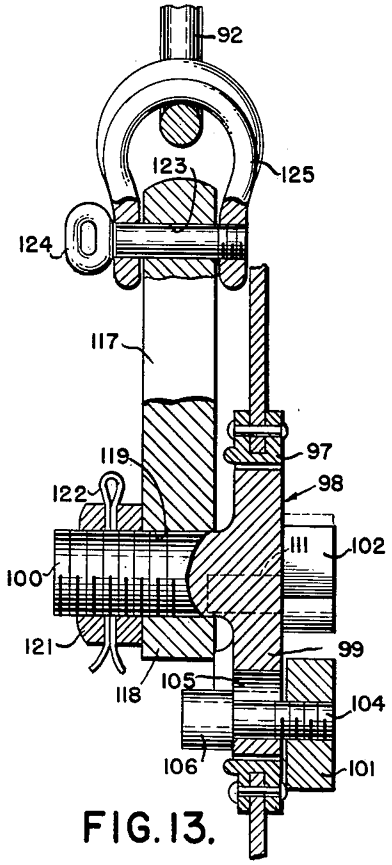
Figure 12:
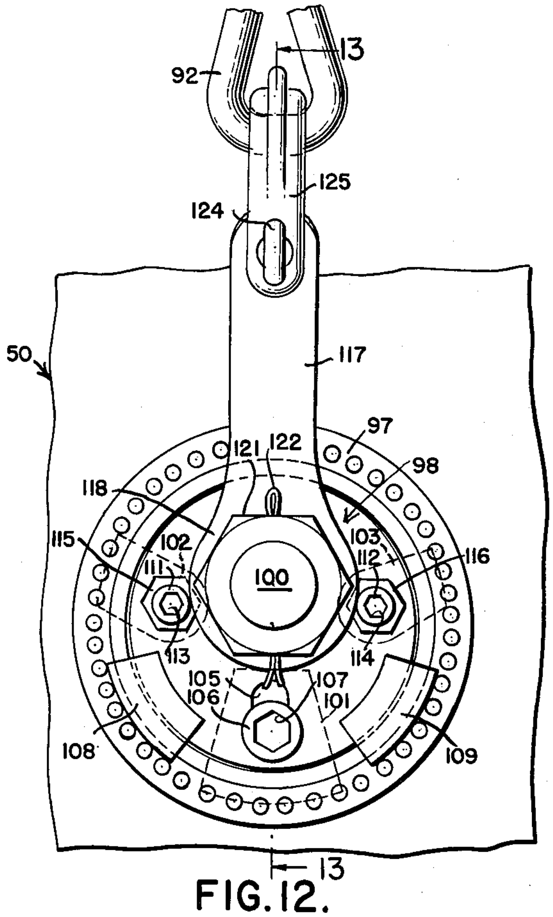
Figure 14:
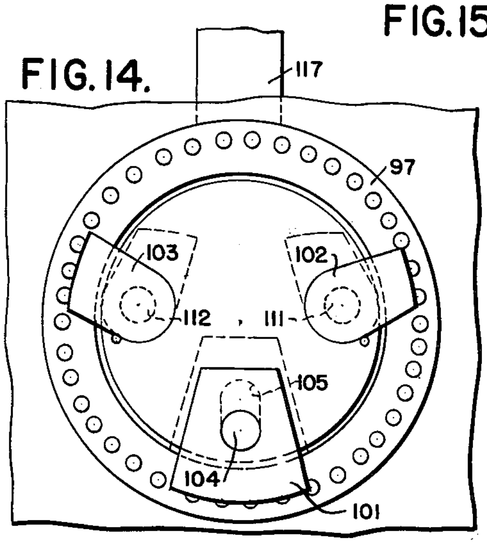
Figure 15:
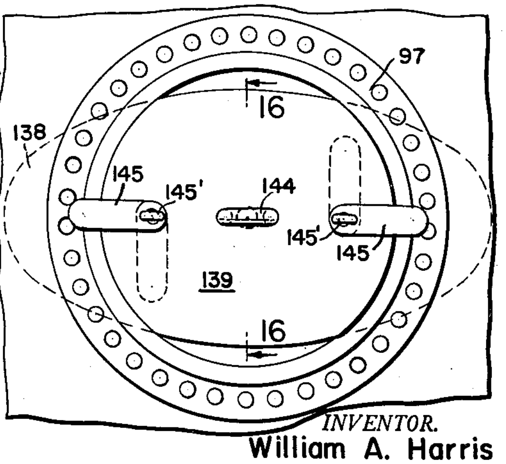

FIG. 12 is a vertical plan view of a porthole clamp device secured in a porthole in the side of the ship, FIG. 13 is a vertical sectional view of the porthole clamp device shown in Fig. 12, the view being taken on 13—13 thereof, FIG. 14 is a rear elevational view of the porthole clamp device shown in FIGS. 12 and 13 as viewed in its clamped position within the porthole and from the interior of the ship, FIG. 15 is a top plan view of a modified form of a porthole grip device lying within the porthole, FIG. 16 is a vertical sectional view of the porthole grip device shown in FIG. 15 and as viewed on line 16—16 of FIG. 15.

Figure 19:
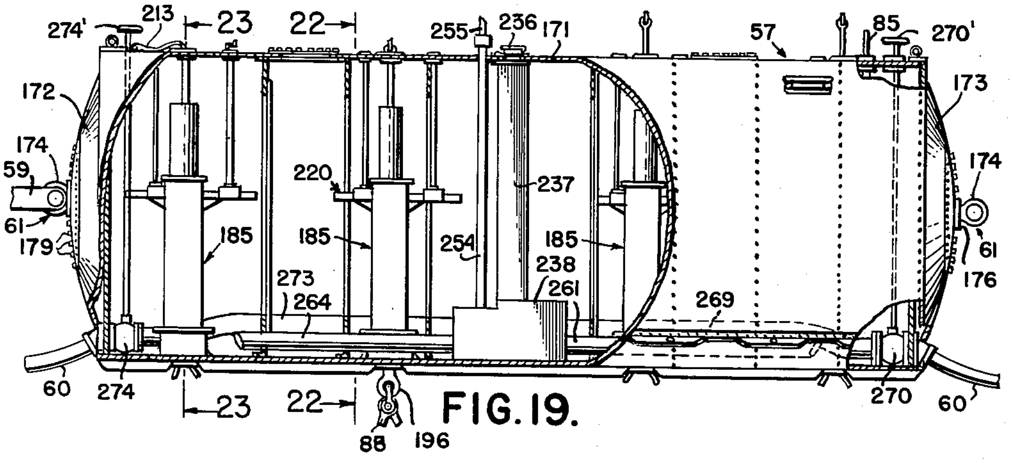
Figures 20, 21, 22:
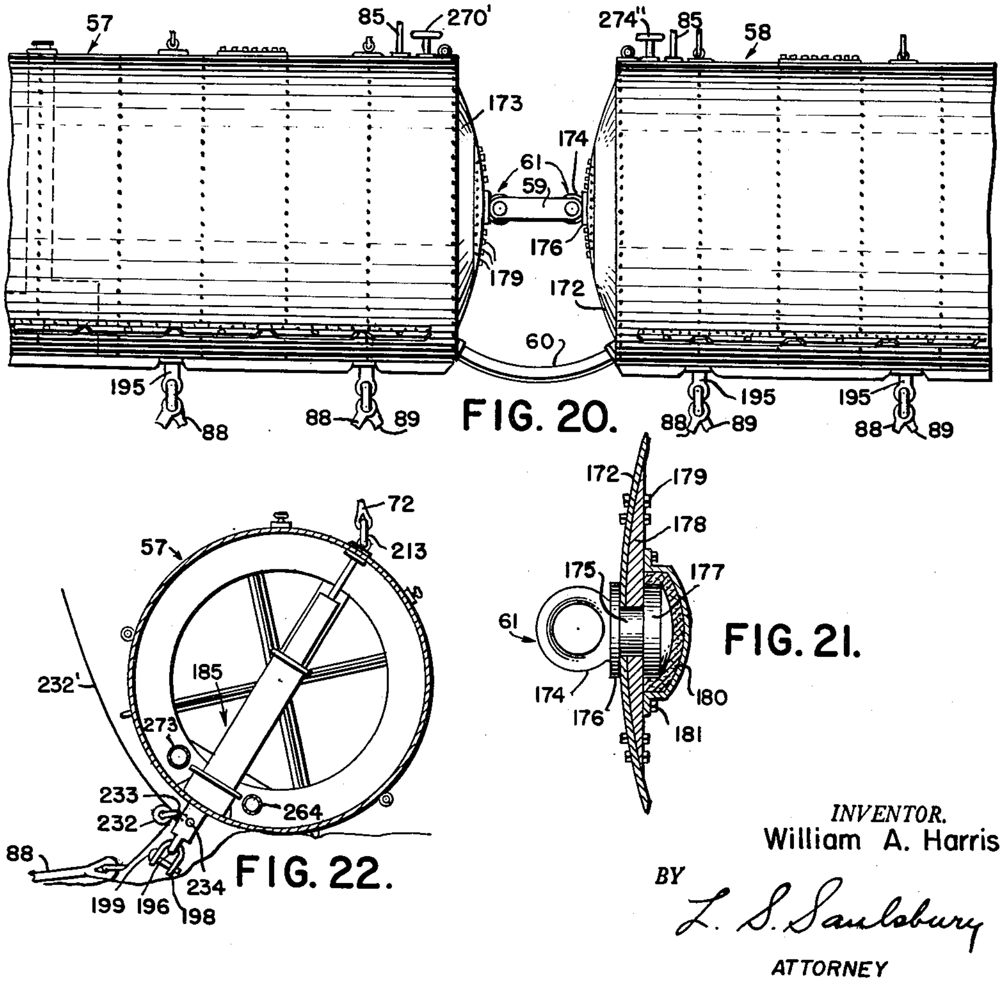
Figures 23, 24, 25:
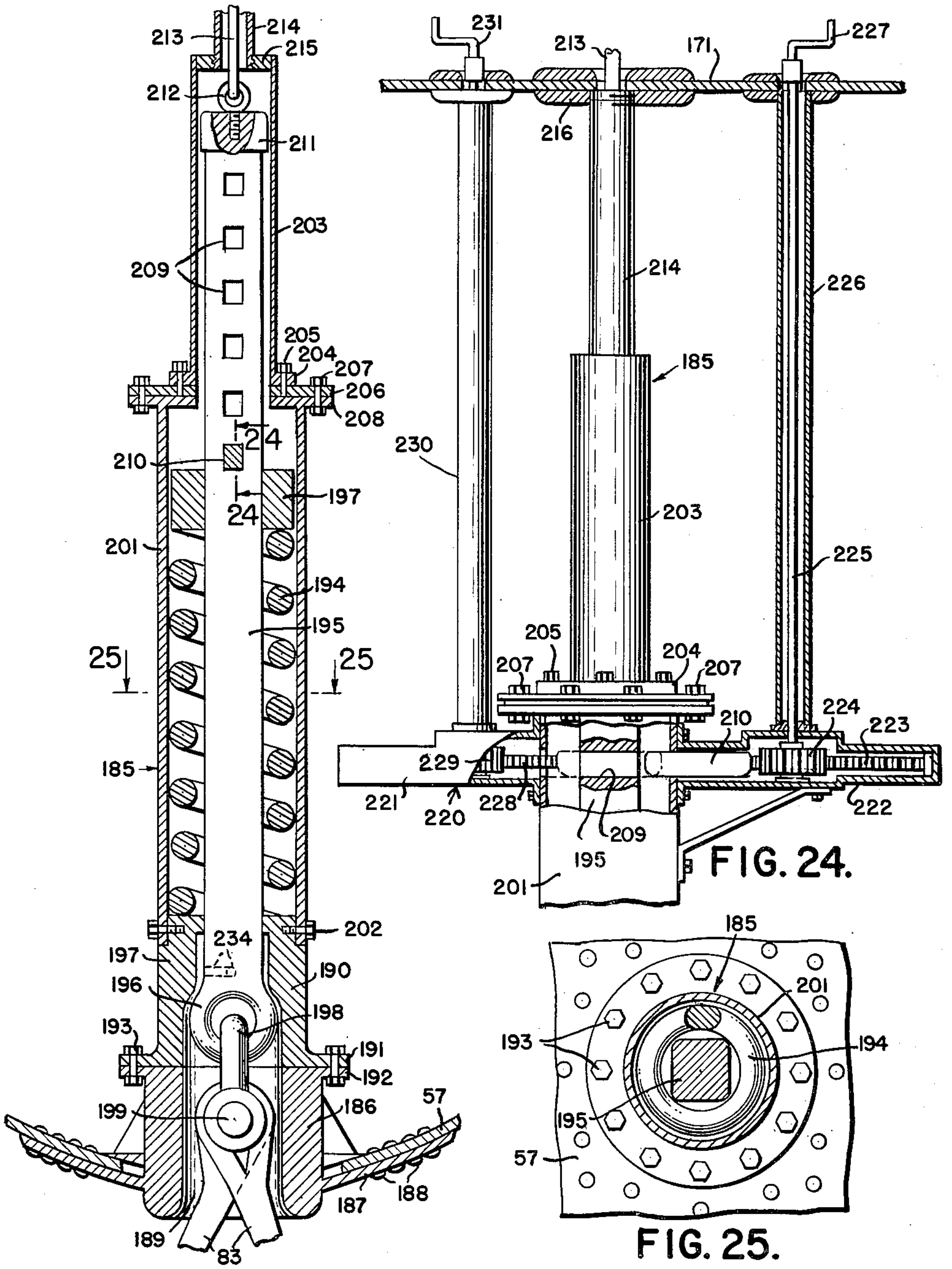
Figure 29:
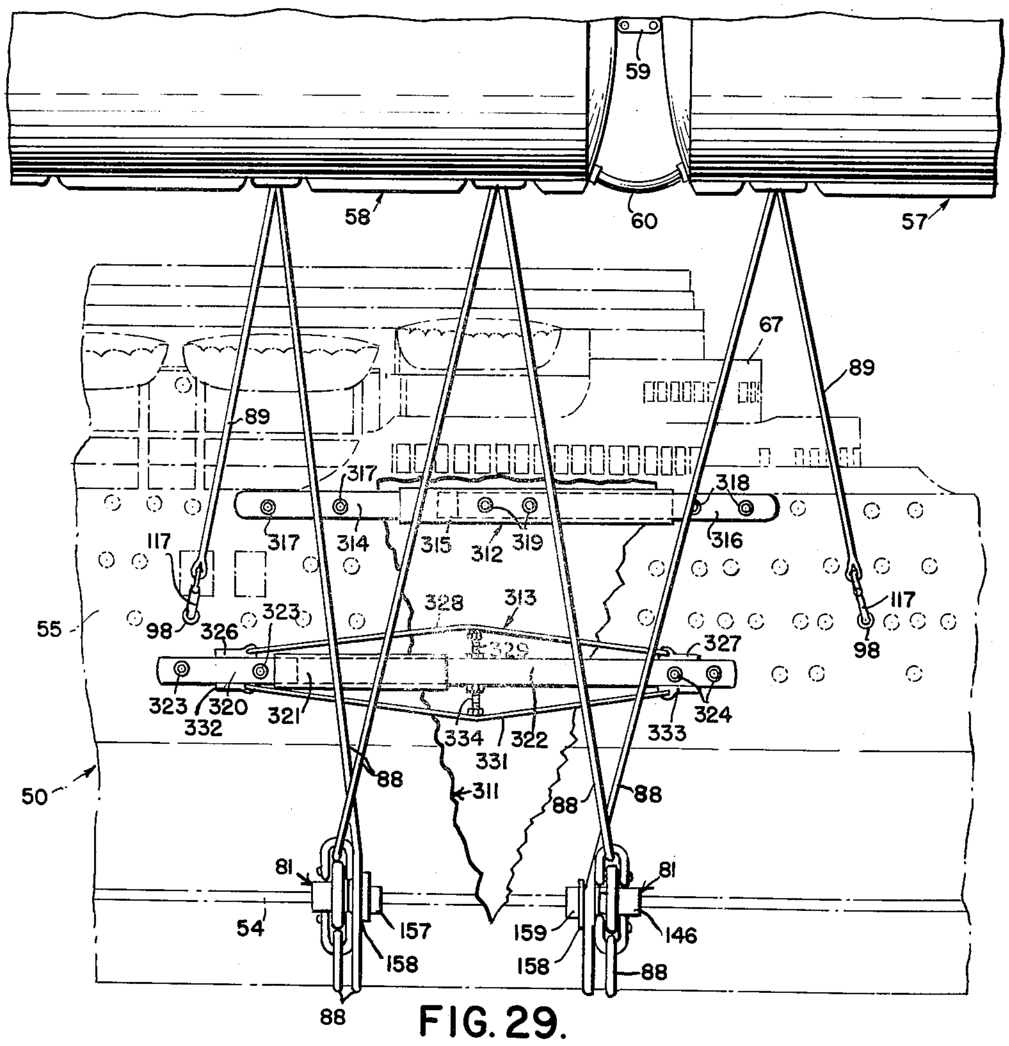

FIG. 17 is a side elevational view of the porthole grip devices shown in FIGS. 15 and 16, FIG. 18 is a side elevational view of the porthole clamp device similar to that shown in FIGS. 12 and 13 applied to the porthole of the ship modified for a pull connection of the cable in a direction normal to the side of the ship, FIG. 19 is an elevational view of one of the pontoons with portions of one side thereof broken away to show devices therein, FIG. 20 is a fragmentary view, in elevation, of two pontoons linked together, FIG. 21 is an enlarged sectional view taken through the swivel connection at one end of a pontoon, FIG. 22 is a sectional view taken through the pontoon on line 22—22 of FIG. 19 and illustrating and showing the manner in which a cable is pulled onto the pontoon for connection with adjustable spring-biased shank devices therein, FIG. 23 is an enlarged vertical sectional view taken through one of the shank devices and as viewed on line 23—23 of FIG. 19, FIG. 24 is an enlarged vertical elevational view of the shank lock pin operating device of stress assembly, the section thereof being taken generally on line 24—24 of FIG. 23, FIG. 25 is a transverse sectional view taken through the shank device on line 25—25 of FIG. 23, FIG. 26 is an enlarged fragmentary longitudinal sectional view taken through the pumping equipment compartment and as viewed generally on line 26—26 of FIG. 27, FIG. 27 is a transverse sectional view taken through the pumping equipment compartment of a mother pontoon and as viewed generally on line 27—27 of FIG. 26, FIG. 28 is a vertical sectional view taken through the water pump-out valve and the operating mechanism therefor, the view being taken generally on line 28—28 of FIG. 27, FIG. 29 is an enlarged elevational view of a portion of the ship having a punctured opening in the starboard side thereof with bracing tie beams or strongbacks extending across the opening and cables running from the pontoons to the bilge keel and to portholes thereof.

Figure 30:
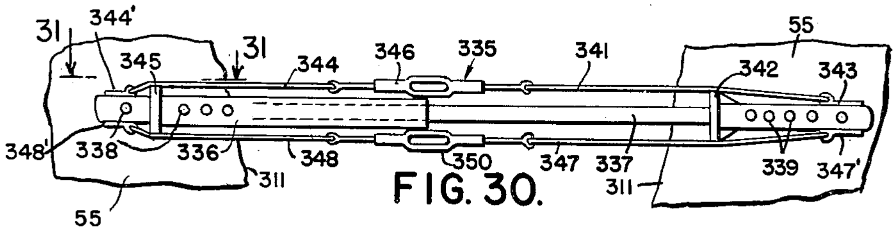
Figure 31:
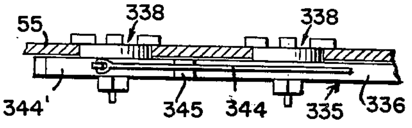

FIG. 30 is an elevational view of modified form of a tie beam or strongback connected between the opposite sides of the punctured opening in the ship, and FIG. 31 is a fragmentary longitudinal sectional view taken through the ship side and one end of the tie beam shown in FIG. 30 and showing the porthole clamps used for securing the tie beam to the sides of the ship.

Referring now particularly to FIGS. 1 and 2, 50 represents a ship lying on its starboard side upon sea floor 51, this ship 50 has a bottom 52 with bilge keels 53 and 54 running respectively along starboard and port sides 55 and 56. The first connections are made with the ship at the bow and stern ends thereof since the flare of the ship at these ends provide space under the starboard side of the ship to run and fasten cables thereunder. The intermediate portion of the ship thereof lies flush and flat on the sea floor making almost impossible the placing of cables thereunder. To turn the ship to its upright position, the cable connections are made for four pontoons to the bow of the ship and in a similar manner four pontoons are connected to the stern end of the ship. The pontoons are indicated generally at 57 and 58. The pontoon 57 is the mother pontoon that houses pumping equipment for pumping out the water therefrom and from child pontoons 58 connected to it. The pontoons 58 are connected to the mother by a mechanical coupling link 59 and a flexible water hose 60. A swivel eye connecting device 61 is provided on each end of each pontoon for the connection of the link 59 with the pontoons.

The bow and stern ends of the ship are respectively indicated at 63 and 64. On the stern end of the ship are propellers 65 and a rudder 66. The ship also has a bridge and upper deck superstructure 67 for which care must be taken in the placing of cables about the ship to prevent injury thereto. In FIG. 2, there is shown a connection of the pontoons to the bow end 63 of the ship. The lower or starboard pontoons 57 and 58 are first placed on the sea floor forward of the bridge and are connected by cables 68 and 69 to various solid members upon the bow of the ship. The cables 68 may enter hawser pipe or anchor openings 70 on the starboard side of the ship while cables 69 are extended around the bottom of the ship upwardly over the port side through chocks 71 and secured to bitts 71' on the decks. These cables 69 are thus wrapped around the bottom and both sides of the ship.

Upper or holding pontoons 57 and 58 are suspended just above the port side of the ship by cables 72 running upwardly to a surface ship. These holding pontoons 57 and 58 could also be placed on the sea floor adjacent to the bottom of the ship for the purpose of securing cables thereto. The upper pontoon 58 is partly filled with air and is connected to the bow 63 of the ship by cables 73 and 74. The cable 73 is connected through a hawser pipe or anchor opening 75 on the port side of the ship, while the cables 74 extend downwardly over the port side, around the bottom and under the starboard side for connection with bitts 76 located on the peak and main decks at the starboard side thereof.

In order to keep the cables 69 and 74 from sliding up the stem piece of the bow 63, a tie cable 77 is extended from portholes 78 on the sides of the ship rearwardly of the cables and fastened to these cables by a series of spaced locking clamps or shackles 79 thereon.

Lying in alignment with the pontoon 58 on the sea floor is a motherpontoon 57 and coupled thereto in the manner as above described. The bilge keels 53 and 54 respectively have cable clamps 81 and 82 for protecting the bilge keels and securing the cables thereto. This holding pontoon 57 is connected by cables 84 that run under the starboard side and over the bilge keels 53 and 54 and are secured by porthole clamps to the port side of the ship.

Cables 83 extend from an elevated mother pontoon 57 over the port side of the ship, the bilge keel 54 and, the bottom 52 of the ship, over the bilge keel 53 over the starboard side and connected to the lower mother pontoon 57. Both the cables 83 and 84 are alternately connected to and extend over the bilge keel clamps 81 and 82 in a cradle-like manner to be hereinafter described.

It will be seen that because of the flare of the bow of the ship the cables can be easily extended under the ship while it is resting on its starboard side. By placing the cables about the ship in the cradle-like manner, the pulling strain upon the keels will be equalized.

It should be understood that four pontoons are similarly connected to the stern end of the ship, the flaring on that end of the ship being also as to permit the cables to be easily extended thereunder. With the pontoons so positioned and connected to the ship the uprighting operation can be begun. The pump in the lower or starboard pontoon 57 in both bow and stern ends are started to displace water with air in the lower turning pontoons 57 and 58. Air is fed to the pontoons from the sea surface through hose lines 85. A lifting and turning force is thus effected upon the starboard side of the ship by emptying the lower pontoons of water. In order to keep the lower pontoons from crushing the bridge and upper deck superstructure 67 of the ship, pull lines 86 are connected to the lower pontoons 57 and 58 and are drawn and placed under tension by service ships 87.

The pumping of the starboard pontoons continues and when the ship has been turned forty-five degrees from the sea floor, the pumping out of the upper holding pontoons is carried further. The upper or holding pontoons 57 and 58 thereby serve as steadying pontoons to prevent the ship from rolling over the perpendicular position as the ship is uprighted. Prior to starting the uprighting operation cables 88 had been placed on the sea floor, FIG. 1, by the intermediate or midship portion of the ship and as the ship is uprighted its bottom will overlie them.

With the cables 88 at hand, four additional child pontoons 58 are placed in pairs over the intermediate portion of the ship and in longitudinal alignment with the starboard and port uprighting pontoons. They are coupled to the uprighting pontoons by links 59 and hose connection 60 so as to work therewith for finally raising the ship from the sea floor. These cables are fastened about the keels 53 and 54 by means of bilge keel clamps, as best illustrated in FIG. 4. The cables 68, 69, 74, 83 and 84 for the uprighting pontoons 57 and 58 at the bow and stern ends of the ship are realigned, shortened, adjusted or replaced with other cables. Likewise certain of the cables 74 and 83 of the pontoons 57 and 58 can be readjusted on the ship or replaced to provide cables 89 for connection with the portholes on the sides of the ship. The eight pontoons at each side of the ship as shown in FIG. 4 will accordingly lie elevated above the superstructure 67 and when filled with air will have sufficient force to elevate the ship from the sea floor so that it may be carried into shallow water, shore approach or to a sea dock. The ship can be raised more fully to the surface by simply readjusting the cables and pontoons so they assume positions against the side of the ship as best shown in FIG. 5. This can be done by doubling the cables upon themselves or with other cables and connecting them on the bilge keel clamps and to portholes at the lower elevations upon the ship. The pontoons are provided on their sides with fender guard planking 90 and 91, FIGS. 5 and 27 to prevent the pontoons and ship from being damaged as movement is imparted to the pontoon by sea swell or action.

Referring now particularly to FIGS. 6 and 7, there is shown the ship being lifted by ten pontoons 57 and 58 connected directly to the port side of the ship by cables 92 and porthole clamps of the types shown in FIGS. 15 and 18. A series of six pontoons are connected together in longitudinal alignment with one another and extend from the bow to the stern. Running parallel to the pontoons is a series of four pontoons extending from the stern of the ship forwardly to the bow, thereby making a total of ten pontoons connected to the port side of the ship. By pumping out the water from all of the pontoons the ship is bodily lifted from the sea floor. It is then carried or taken to one bank of a trench 95 where water is again taken into the pontoons to lower the side of the ship onto the bank so that its bottom will slide into the trench and cause the ship to be uprighted. Prior to the lowering of the ship into the trench, cables will have been laid across the trench in proper spacing so that their ends will be readily available to the divers for securement to the pontoons. Two pontoons 57 and 58 were placed on the sea floor 51 near the bank of the trench 95 and before sliding the ship into the trench are attached to the ship by cables 96, and if needed, can be used to tilt the ship into the trench 95. The two pontoons may not be necessary as the tilting of the ship may be effected by the mere balancing of the starboard side of the ship upon the bank of the trench but they may also be on hand to serve as holding pontoons to prevent the ship from rolling over beyond the upright position. Once the ship has been uprighted in the trench the pontoons can be submerged to the sea floor beside the ship and arranged so as to either lie above the ship, FIG. 4, or to lie against the sides of the ship, FIG. 5. As water is again pumped out of the pontoons, the ship is lifted to the surface.

Referring now particularly to FIGS. 12, 13 and 14, there is shown a porthole ring or frame 97 that defines the porthole opening into which porthole clamp 98 is inserted. This clamp 98 has a plug body 99 with a threaded stem 100 having its axis offset from the center of plug body. On the inner face of the plug body 99 is a slidable clamp lug 101 adapted to overlie the lower edge of the porthole ring 97 and turn clamp lugs 102 and 103 lying respectively at the opposite sides of the plug body 99 and adapted to be turned into a locking position to engage the inner side of the porthole ring 97.

The clamp lug 101 is made secure against inward displacement by a bolt 104 that extends through an elongated slot 105 and has a head 106 that has a wrench opening 107 into which a wrench can be inserted and the bolt turned to make secure the lug 101 against inner face of the ring 97. On the outer side of the plug body, are two fixed stop members 108 and 109 that overlie the edge of the plug body and will engage the outer face of the porthole ring to prevent the clamp 98 passing entirely through the porthole. The turn clamp lugs 102 and 103 respectively have threaded studs 111 and 112 with respective wrench openings 113 and 114 accessible from the outer side of the plug body for a wrench by which they can be turned. Lock nuts 115 and 116 are respectively provided on the bolts 111 and 112 to lock the clamp lugs against turning. A link member 117 having an enlarged end 118 with an opening 119 therein is secured to the threaded stem 100 so that the stem extends through the opening 119 and is made secure thereon by a lock nut 121 and a cotter pin 122. The upper end of the link member 117 has a pin opening 123 through which a threaded pin 124 extends for the securement of a shackle 125 of a cable 92 thereto. This particular clamp arrangement is particularly adaptable where the cables from the portholes extend upwardly and parallel to the sides of the ship.

Where a porthole clamp is to be used for attachment to the portholes so that the cables may extend normal to the side of the ship a similar clamp as shown in FIG. 18 is used except that the link member 117 is not needed. A threaded sleeve cap 126 having an eye portion 127 to which a cable shackle is attached to a short threaded stem 128 that is in this case located at the center of the plug body 129. The plug body 129 has a flange 131 adapted to engage the outer face of the porthole ring 97 and lugs 132, 133 and 134. These lugs have respectively stems 135, 136 and 137. This porthole clamp will be similarly applied to the porthole by a wrench tool.

In FIGS. 15, 16 and 17, there is provided a porthole grip device 138 which can be readily attached without adjustable securing lugs and with its cable being adapted to extend either parallel or normal to the side of the ship. A large mass member 138' generally of elliptical shape in plan and having a rounded convex elliptical bottom face and a top centering portion 139 adapted to span in its long dimension the width of the opening but in its short dimension adapted to be left free of the sides of the opening so that it can be easily inserted through the porthole in the manner illustrated in FIG. 17 to assume therein the position shown in full therein with its end flanges well seated under the porthole ring 97. A long eye pin 140 extends through the center of the body member 138' and is welded at 141 in a recess 142 on the convex face of the body and also welded at 143 to the face of the centering portion 139. This eye pin 140 has a ring head 144 to which a cable 92 is attached. The porthole clamp is lowered by its cable 92 through a porthole on the side of the ship while a diver tilts the same to thrust its sharp end through the porthole glass and upon the cable being tightened the elliptical body 138 will engage with the underface of the porthole ring and its centering portion 139 brought into the opening. Where the portholes are not available, the cables can be attached as mentioned above to the anchor openings, the bitts on the deck, the propeller shaft, the bilge keels or to any other part of the ship that is a rigid and a load-carrying part thereof. In order to keep the large mass body 138 within the porthole and from being lowered into the interior of the ship, lugs 145 are turned into a position to overlie the porthole ring 97. Hand screws 145' are then tightened to hold the lugs 145 in place.

In FIGS. 8 and 9, each of the bilge keel clamps 81 and 82 has a bifurcated clamp block 146 with openings at the opposite ends thereof through which shackle pins 147 and 148 may extend to secure pairs of shackle members 149 and 150 thereto by which with a pin 151 for a short port cable 83 is attached and by means of shackle members 150 and a pin 153 by which a long starboard cable 84 is attached. The block 146 has furcations 154 which straddle the bilge keel 54 or 53 and are respectively secured to the sides thereof by set screws 155 and 156. This clamp block 146 has a lateral cable guide extension 157 running with the side of the ship in which there is an outwardly facing cable guide groove 158 over which the long cable runs in order to prevent wear of the cable upon the less wide edge of the bilge keel. With the cables connected in this cradle-like manner to the bilge keel, the pulling pressures across the bilge keels are equalized so that the bilge keel clamps serve only in effect to guide the long cables and to retain them against longitudinal displacement along the bottom of the ship.

Referring now to FIGS. 10 and 11, a slightly different modified form of a bilge keel clamp is used. The clamp differs in the shape of its body formation. This type of clamp comprises a body 160 having a chain link formation 161 to which the short and long cables 83 and 84 are respectively connected by sister chain links 162 and 163. The clamp body 160 has furcations 164 which are connected to the bilge keel by four set screws 165 and 166. The furcations have considerable width and to one side of the clamp thereof there is a cable guide extension 167 with a groove 168 in the face thereof for supporting and guiding the long cable.

Referring now particularly to FIGS. 19 to 28, inclusive, there is shown the detail construction of the pontoons 57 and 58, and in particular the mother pontoon 57. This pontoon 57 has a cylindrical shell 171 closed at its ends by headers 172 and 173 with swivel connectors 61, FIG. 21, rotatable therein. This swivel connector 61 has an eye portion 174 and a shank portion 175 with spaced flanges 176 and 177 thereon. The shank portion 175 is journaled in the header 172 or 173 and in a reinforcing plate 178 secured to the header by fastening screws 179. In order to prevent leakage along the shank 175, a sealing cap 180 is secured over the flange 177 and to the reinforcing plate 178 by fastening screws 181. These pontoons are linked together by the connecting link 59 and releasable bolt pins.

Both pontoons 57 and 58 have four stress units 185 longitudinally-spaced from one another to which the various cables are connected. Each of these stress units 185 extend throughout the full height of the pontoon which may be approximately thirty-six feet where the pontoons are to be used to raise large ocean liners. The length of the pontoon would run over one hundred feet.

Each of the stress units 185 as best shown in FIG. 23, has a flanged base casting 186 attached to the lower side of the pontoon 57 or 58 by its flange 187 and rivets 188. This base casting 186 has an opening 189 therethrough and on the top of the same there is fixed a stop sleeve 190 secured by its flange 191 to a top flange 192 of the base casting 186 by fastening bolts 193. Supported on top of the stop sleeve 190 is a coil compression spring 194 that surrounds a square shank 195 and is slidable through the casting 186 and sleeve 190 and which has an eye formation 196 that may engage a shoulder 197 in the sleeve 190 to limit its upward movement resulting from the action of a spring 194 against an adjustable head or collar 197. To the eye formation 196 cables 83 are connected by a shackle 198 and a pin 199. A cylindrical sleeve 201 is secured to the upper end of the stop sleeve 190 by fastening screws 202 and surrounds the spring 194 and shank 195. Mounted on the upper end of the housing 201 is a reduced diameter housing 203 into which the upper end of the square shank 195 extends. This housing 203 is secured by its flange 204 and fastening screws 205 to a plate 206 which is in turn secured by fastening screws 207 to a flange 208 on the upper end of the housing 201. The upper end of the shank 195 has a plurality of square pin adjusting holes 209 into which a pin 210 is inserted in its adjusted position and to hold the head or collar 197 against upward displacement upon the shank 209. The pin 210 thus secures the stop collar 197 at different locations and allows the shank 195 to be drawn into the bottom opening 189 of the base 186 to take up the slack in the cable.

On the upper end of the shank is a head formation 211 to which an eye 212 is secured for the attachment thereto of an adjusting cable 213 which extends upwardly through a sleeve 214 secured to a plate 215 on the upper end of a sleeve 203 which is in turn threaded to grommets 216 secured to the top of the cylinder 171. Cable 213 may extend externally of the top of the pontoon and may be picked up by a surface pull cable when the slack in the shank and lifting cables is to be taken up. Indications or marks can be made on the cable 213 which can be observed to properly position the openings 209 for insertion or removal of pin 210 by pin pushing ram or operating gear device 220, Fig. 24.

This operating gear device 220 comprises pin housings 221 and 222 opposingly mounted upon the sides of the housing 201. Each one of these pin housings has a rack bar 223 adapted to engage the end of the pin 210 to thrust it into any of the openings 209 in the shank 195. The rack bar 223 is operated by a pinion 224 connected to the lower end of a shaft 225 which extends upwardly through a sleeve 226 to the top of the cylinder 171 where it has a hand crank 227 attached to it for operation by the diver. The opposing housing has a rack bar 228 that serves to push the pin 210 out of the opening 209 and is operated by a pinion 229 on the lower end of a similar shaft which extends upwardly through a sleeve 230 and which has a hand crank 231 on its upper end. The hand cranks 227 and 231 are adjustable by a diver so that the diver can insert the pin 210 by using the crank 227 or remove it by using the crank 231. When all of the stress units 185 are adjusted to take up the slack of their cables, the pontoons will be made level and ready for lifting the ship.

The stress units are extended prior to the pontoons being submerged so that shank eyes will be available for the connection of the cables thereto. In FIG. 22, there is illustrated the manner in which the cables may be drawn over the sea bottom for attachment to the shank eyes. A snatch block 232 is made secure to the stress unit shank 195 by a screw eye 233 threaded in to either of two holes 234 in the shank 195 extending at an angle of ninety degrees apart. A pull line 232′ runs from the surface through the block 232 and is connected by a releasable hook or shackle to the cable 88. When the cable has been drawn into place so that its loop end may be easily secured by the shackle 198 to the eye 196 of the shank 195 the pull line is released and the shackle is made fast to the cable loop end by its pin 199.

The mother pontoon 57 has a top opening hatch 235 with a hinge lock cover 236 thereon, FIG. 26. Below the hatch 235 is a long vertical passage 237 that leads to a pump compartment 239 into which access is had through the hatch 235 and ladder 241. A flooding pipe 242 leads from the outside of the pontoon to the compartment 239 and has control valves 243 and 244 therein, the valve 243 lying outside of the pontoon and the valve 244 lying inside the compartment 239. Before the hatch cover 236 can be opened, the outside valve 243 is opened and the compartment 239 is flooded. The diver enters the flooded compartment, closes and secures the hatch cover 236, and closes the valve 244. An inner hatch 246 is provided on a partition 247 over an opening 248 therein and a ladder 249 that leads down a lower compartment 250 and into the pump compartment 238. The water in compartment 239 is drained into the pump compartment 238 by opening a drain valve 251 in compartment 239 so the water will pass through a vertically-extending drain pipe 252 that extends through the compartment 250 to the pump compartment 238. Thereafter, the hatch 246 may be opened and the diver may descend into the pump compartment 238 for any repairs and control of the equipment therein.

An air tube 254 leads from the pump compartment 238 directly upwardly through the top of the pontoon and to which a flexible hose 255 is coupled. The hose 255 leads to the surface so as to force cooling air to the pump compartment 238. To provide for circulation, air is vented from compartment 250 through a small vent pipe 254′ and a flexible hose 255′ running to the surface. When the hoses 255 and 255′ are detached the pipes 254 and 255 may be closed by thread caps.

A water inlet port 256 is provided at the bottom of the mother pontoon 57 to deliver water through a pipe 257 to a submerging or flood valve 258. When the submerging valve 258 is opened, water is delivered through a T-fitting 259, a valve 260 and open pipe 261 to flood one end of the pontoon 57. Also water is delivered from the valve 258 through a pipe coupling 262, valve 263 and open pipe 264 to flood the opposite end of the pontoon 57.

In order that the child pontoons 58 are simultaneously submerged, water is also allowed to pass from the T-fitting 259 to a T-fitting 266 that leads to a pump 267 where with the pump not working it will be prevented from passing therethrough. This water passes through valve 268 and pipe line 269, valve 270 at the end of the pontoon, FIGS. 19 and 20, hose coupling 60 leading to an adjacent pontoon 58, and the valve 270 is normally maintained in an open position and has a hand operating wheel 270′ at the top of the pontoon by which it can be closed or opened to control the flow of flooding water between the pontoons. A similar control valve operated by a wheel 274″ is provided in the pontoon 58 to control the flow of water into that pontoon. A pipe 271 leads from the T-fitting 266 in an opposite direction to a valve 272 and a pipe 273 that is connected to a valve 274 at the opposite end of the pontoon 57 which can be operated by a hand wheel 274′ at the top of the pontoon 57. A hose coupling 60 at that end of the pontoon will lead to another child pontoon 58 connected therewith. The flow of flooding water to the two pontoons 58 can thus be controlled from the pump compartment 238 of the mother pontoon, 57.

The pump 267 is driven by an electric motor 276 controlled by an electric switch 277 to which a cable line 278 running through the top of the pontoon and connected with the surface by an electric supply line 279. Adequate controls are provided at the surface and are normally used to control the operation of the pump from the surface. A pump discharge valve 281 is connected to the pump 267 and lies in a water discharge pipe line 282 which has a one-way sea valve or sea cock 282′ and an emergency shut off valve 283 therein. This pipe line 282 has a port 283′ through which water from the pontoon will be discharged upon the pump being operated. At this time the main inlet valve 258 is closed and the other valves 260, 263, 268 and 272 will be open depending upon the pontoons from which it is desired that the water be removed. Continued operation of the pump 267 will completely remove the water from the pontoons and allow the same to be filled with air. The air will have entered these pontoons through the air hoses 85 that extend to the surface of the sea water.

The valve 281 has a gate element 284, FIG. 28. A neck casting 285 extends upwardly from the valve body. A screw stem 286 extends through a threaded operating member 287 lying on the top of the neck casting 285 and is rigidly connected with a gear 288. The gate valve 284 is connected to the lower end of the screw stem 286 and is opened and closed thereby. This gear 288 has pinions 291 and 292 connected to the respective opposite sides thereof and operated respectively by oppositively running electric motors 293 and 294. A mounting plate 296 is connected to the top of the pump compartment wall 238 by screws 297 and has depending housings 298 and 299 secured thereto. A cable supply line 281′ leads from the valve motors 293 and 294 through the top of the pontoon and to the surface where adequate controls can be provided for controlling the operation of the pontoons from the sea surface.

At times when it is desired to open or close the gate valve 281 independently of the electric motors 293 and 294 gear 288 can be turned by hand. A sleeve 301 surrounds the threaded stem 286 and is connected by its flange 302 to the top of the gear 288. A shaft 303 extends upwardly from the sleeve 301 and terminates externally of the top of the pontoon 57 with a squared end 304 to which a socket wrench or wheel can be attached. A platform 305 is provided on the top of the pontoon 57 on which the diver or operator can stand to open the cover 236, to turn the valve shaft 303 and to make fast various hose connections. The diver can thus control the descent of the pontoon from the top thereof and ride downwardly with them.

In the starboard side of the ship 50, is a large wedge-shaped opening 311 that weakens the walls of the ship. In order to brace the opening, there has been provided various brace bar or strongback constructions that can be used as shown in FIGS. 29, 30 and 31. One such brace bar 312 is shown extended across the top of the opening 311. Another brace bar 313 of a truss type is extended across the opening therebelow.

The brace bar or strongback 312 is formed of a bar part 314 having a sleeve 315 thereon and a bar part 316 telescoping into the sleeve 315. The bar part 314 is secured to one side of the opening 311 by porthole clamps 317 and at the other part 316 is secured to the other side of the opening by porthole clamps 318. Set screws 319 in the sleeve 315 secure the parts against longitudinally displacement from one another and makes the adjusted bar rigid.

The brace bar 313 is of slightly different construction. It employs a bar part 320 having a sleeve portion 321 in which a part 322 is adjustable. The part 320 is connected by porthole clamps 323 to the one side of the opening 311. The part 322 is connected to the other side of the opening by porthole clamps 324. On the respective bar parts 320 and 322 are attaching plates 326 and 327 between which are secured a reinforcing truss cable 328 that can be placed under tension by a screw jack 329 carried on the bar part 322. A reinforcing truss cable 331 is connected between the attaching plates 332 and 333 at the lower side of the bar and is tightened by a screw jack 334 depending therefrom.

It should be apparent that with these bracing bars tightly clamped to the side of the ship, the ship will be tied together longitudinally across the opening 311 thereby to minimize the possibility of further fracture.

In FIGS. 30 and 31, there is shown a brace bar or strongback 335 of a still different form in which the brace bar is finally adjusted by turn buckle rods. This brace bar has a sleeve part 336 and a bar part 337 slidable therein. The sleeve part 336 is connected to the side of the ship 55 at one side of the opening 311 by porthole clamps 338. The bar part 337 is connected to the ship at the opposite side of the opening 311 by porthole clamps 339. A truss rod 341 bends over a support 342 on the bar part 337 and is secured to the bar part 337 by an attaching plate 343. A truss rod 344 is bent over a support 345 and is connected by an attaching plate 344′ to the sleeve part 336. A turn buckle device 346 secures the truss rods 341 and 344 together and will serve when turned to tighten or release them.

A truss rod 347 extends over the underside of support 342 on bar part 337 and is secured to the bar part by attaching plate 347′. A truss rod 348 extends over support 345 on sleeve part 336 and is secured thereto by an attaching plate 348′. A turn buckle device 350 is secured between the two truss rods 347 and 348. By tightening the turn buckle devices the sides of the opening can be placed under longitudinal stress. The bar parts can be of any desired length according to the size of the fracture.

It should now be apparent that there has been provided a method and apparatus for raising large ships of the ocean liner type from the bottom of the sea.

It should be further apparent that the equipment provided for this purpose is so constructed and formed that it can be easily attached to the ship in such a manner as to effect the turning or uprighting of the ship from its side and as well be readily adjusted and adapted to the ship for effecting the final lifting of the ship to the surface after it has been uprighted. The pontoons are adapted to be placed either above or against the sides of the ship so that the ship can be held either in suspension under the surface while being carried to a shore approach to avoid the storms at sea or that by simple adjustment of cables and arrangement of pontoons they can be brought into close coupled relationship upon the sides of the ship to bring the ship fully to the surface as it is taken from shallow waters to the port.

It should also be apparent that with the provision of the stress units on the pontoons by which the cables are attached thereto that the slack in these cables can be readily taken up to thereby level the pontoons and to equalize the lifting forces imparted to the cables, and that such cables supported within the unit upon cushioning springs so as to allow the pontoons to adapt themselves to sea action.

It shall be further apparent that all operations in making connection of the cables and the pontoons to the ship may be effected by skin divers in placing the cables upon the ship either by simple porthole clamps, bilge keel clamps, and with simple means for pulling or securing cables to the extended stress unit shanks on the underside of the cable.

It should also be apparent that there are ample connections for controlling the movement of the pontoons in the sea from the surface, the supply of air and electric current and other auxiliary controls that can control the pontoons from the surface and as well wherein provision is made for the control of the pontoons as by the diver standing on top of the pontoons.

While different ways may be considered in the carrying out of this particular method and wherein different detail apparatus can be used, it shall be understood that such ways and apparatus shall fall within the spirit and scope of the present invention as defined by the appended claims.

What is claimed is:

1. A lifting apparatus for raising sunken ships comprising lifting pontoons and cables suspended from the pontoons and connected to the ship, said lifting pontoons having adjustable spring biased stress units embodied therein to which the cables are attached for taking up the slack of the cables and minimizing the effect of surface disturbances upon the pontoons, said stress units having shanks adapted to be extended from the lower side of the pontoon, and snatch cable block means adapted to be secured to the extended stress unit shank to pull cables lying on the sea floor into alignment with the ends of the shank for the affixing of the cables thereto.

2. A lifting apparatus for raising sunken ships comprising lifting pontoons and cables suspended from the pontoons and connected to the ship, said lifting pontoons having adjustable spring biased stress units embodied therein to which the cables are attached for taking up the slack of the cables and minimizing the effect of surface disturbances upon the pontoons, each of said stress units comprising a hollow base casting secured to the bottom wall of the pontoon, a stop sleeve on the base member, a shank slidable through the stop sleeve member and having an enlarged eye engageable with the walls of the sleeve to limit its upward movement thereto, said shank having a series of adjusting holes, a stop head collar slidably adjustable upon said shank, a locking pin extendable through the adjusting holes to hold the stop head collar against upward displacement, a compression spring resting upon the stop sleeve and supporting the stop collar and the shank, a pull cable extendable from the upper end of the shank and outwardly through the top of the pontoon and accessible from the top of the pontoon and means for effecting the insertion and removal of the locking pin in the adjusting holes of the shank.

3. A lifting apparatus for raising sunken ships comprising lifting cables adapted to be attached at one end to one side of the ship and to extend about the bottom and sides of the ship in opposite directions to arrange the cables in a cradle-like fashion under the ship and means adapted to be secured to the bilge keels for attaching and guiding said cables to and over the bilge keels of the ship, and pontoons adapted to be connected to the other ends of said cables at the opposite end of the ship, said bilge keel attaching means comprising a body having furcations that lie on the opposite sides of a bilge keel, set screw means for securing said furcations to the opposite sides of the bilge keel, a cable-attaching portion adapted to receive shackle connections of the cables and a guiding groove portion to provide a wear surface for the extension of one of the cradle cables thereover.

4. A strongback or bracing bar connected across an opening in the side of a ship comprising longitudinally-adjustable brace bar parts, porthole clamp devices on each of said parts adapted to secure the parts to the portholes in the sides of a ship and reinforcing truss members adjustably secured between the ship attaching ends of the bracing bar parts.

5. A strongback or bracing bar as defined in claim 4, and said truss members having turn buckle devices and adjustable to place the bracing bar under tension between the sides of the opening.

6. A method of raising large sunken ships of the ocean liner type resting on their sides at the bottom of the sea, which consists of applying turning cables that extend from one side of the ship to the other and fastened at one end thereto and submerged low and high pontoons connected respectively to the other ends of the cable and at the flared bow and stern ends of the ship, first operating the low pontoons and cables to effect a turning force upon the low side of the ship while operating the high pontoon to maintain a stabilizing force as the ship is uprighted, applying further cables and even elevated pontoons to the opposite sides of the uprighted ship intermediate the cable and pontoons at the bow and stern ends and further operating all of the pontoons to vertically lift the ship to the sea surface.

7. A lifting apparatus for raising sunken ships comprising lifting cables, one of said cables being attached at one end to one side of the ship and extending down and around the bottom of the ship and up the other side thereof, another of said cables being attached at one end to said other side and extending down and around the bottom of the ship and up the said one side to arrange the cables in a cradle-like fashion under the ship, means secured to the bilge keels of the ship for attaching and guiding said cables to and over the bilge keels whereby to equalize the pulling forces on the bilge keels, and pontoons connected to the other end of the said cables at both sides of the ship.

References Cited in the file of this patent

UNITED STATES PATENTS

| | | |
|---|---|---|
| 572,364 | Midford | Dec. 1, 1896 |
| 827,477 | Tito | July 31, 1906 |
| 1,168,982 | Walker | Jan. 18, 1916 |
| 1,308,168 | Courvoisier | July 1, 1919 |
| 1,368,787 | De Graff | Feb. 15, 1921 |
| 1,370,458 | Lindquist | Mar. 21, 1921 |
| 2,156,166 | Smith | Apr. 25, 1939 |
| 2,346,974 | Kyne | Apr. 18, 1944 |
| 2,372,039 | Winkler | Mar. 20, 1945 |
| 2,397,210 | Schramm | Mar. 26, 1946 |
| 2,520,864 | Thornhill | Aug. 29, 1950 |
| 2,622,552 | Jamison | Dec. 23, 1952 |
| 2,705,574 | Schoessow et al. | Apr. 5, 1955 |